Patented Oct. 6, 1931

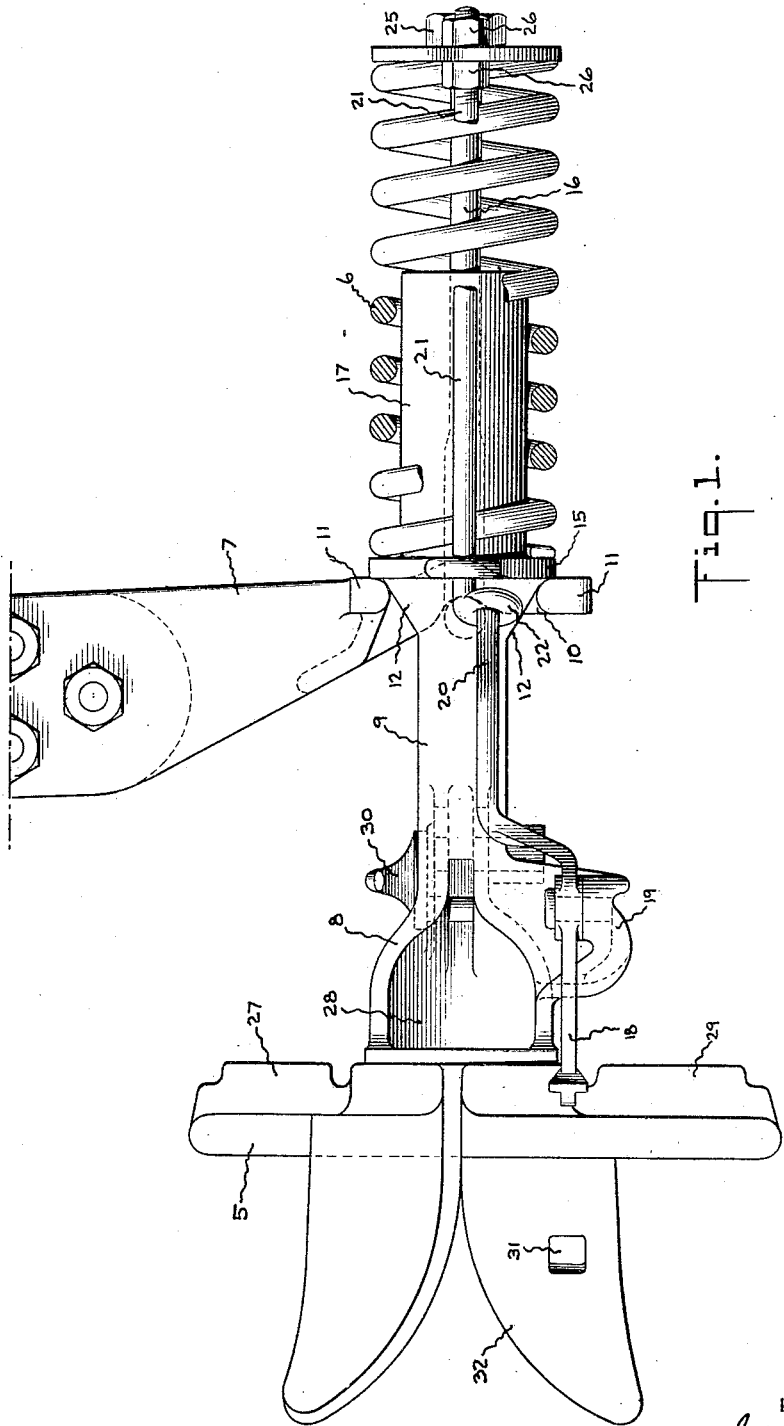

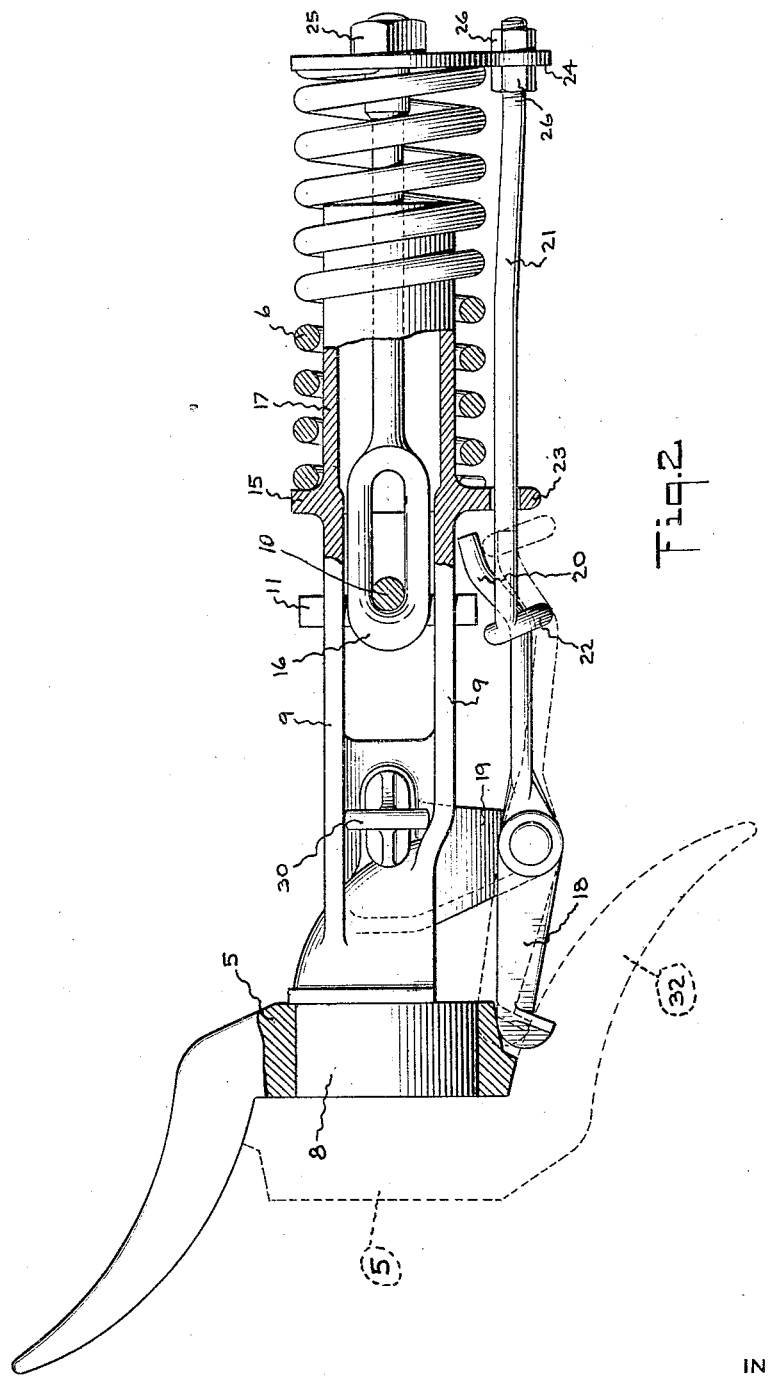

1,826,288

UNITED STATES PATENT OFFICE

JOSEPH ROBINSON, OF NEW YORK, N. Y.

AUTOMATIC AIR AND STEAM HOSE CONNECTER

Application filed June 18, 1928. Serial No. 286,266.

My invention relates to automatic air and steam hose connecters, and among the objects is to provide a positive lock for automatically locking the connecter heads together, and automatically unlocking them, simultaneously with the coupling and uncoupling of the cars. The construction is rugged, positive in operation, and extremely simple. In the drawings Figure 1 is a sectional side elevation showing my improvement in the uncoupled position, and Figure 2 is a part sectional plan view thereof in the coupled position.

The lock may be applied to any desired type of automatic connecter or any form of coupling head thereof. It is shown applied to the wing type butt face coupling head 5 carried by a flexible support in which the supporting spring 6 is located behind the bracket 7. A suitable pipe or hollow body 8, comprising spaced members 9 which extend around or embrace a preferably vertically disposed cylindrically shaped lug or anchor device 10 formed integral with or otherwise secured to the lower end of the bracket. Trunnions or supports 11 extend transversely away from the sides of the bracket or lug and are formed integral therewith or are attached thereto. The supports co-operate with the flared portions 12 of the straps 9 to centrally position the pipe on the bracket and prevent undue rotation thereof in the uncoupled position. Dislodgment of the pipe 8 from the bracket in event of breakage, is prevented by the lower ones of these trunnions or supports, shown particularly in Figure 2. The pipe 8 includes a perforated flange or stop 15 which joins the rear ends of the straps and is normally and yieldingly held against the rear flat face of the bracket 7 by the buffer or supporting spring 6. A tie rod 16 extends thru the spring and has a perforated forward end that is hooked over or is otherwise placed in a curved seat formed on the front face of the lug. The tie rod has rocking movement on the seat, and the meeting surfaces of the tie rod and the seat flare in opposite directions. A cylindrical barrel 17 is secured to the flange 15, or straps 9, in any suitable manner, but preferably formed integral therewith, extends rearwardly of the flange through the spring 6 and around the tie rod 16. The sleeve serves to prevent undue lateral movement of the spring relative to the parts forming my improved lock. These parts include a member or latch 18 pivotally mounted on a bearing 19 of the pipe 8 and adapted to move in any plane best suited to the type of coupling head used. I show the latch mounted to move in the horizontal plane. The shank of the latch extends upwardly to and along the side of the pipe 8 and is cammed at its rear end as at 20, Figure 2. A plunger or throw rod 21 carrying a perforated end or eye 22, which slidingly receives and supports the shank of the latch, extends through a fairly close fitting opening or bearing 23 (Figure 2), formed at one side of the flange 15, along the spring 6 and is adapted to slide in said bearing. The plunger is anchored in a bearing 24, on the nut 25, (Figure 2) which is threaded to the rear end of the tie rod 16 and serves as a stop for maintaining the spring and plunger in position. The plunger is adjustably mounted in the flange of the nut or stop 25 as by means of jam nuts 26, so that it may be shifted to the most suitable position for throwing the lock 18. To facilitate ease of operation of the parts, the head or eye 22 of the plunger is preferably disposed at an angle to the longitudinal direction of the connecter, and slightly to one side of the body of the plunger. Suitable hose and fittings (not shown) are connected to the coupling head 5 at one or more points such as at 27, 28, and 29, the fitting connected at 28 being preferably the air brake hose fitting and being removably mounted in the head by means of a plunger pin 30.

When two cars equipped with automatic connecters having my improved lock are coupled, the coupling heads 5 are moved to the coupled position shown in Figure 1. This operation shoves the pipe 8 rearwardly compressing the spring 6 and causing the shank of the lock 18 to slide through the eye 22 of the plunger 21. During this operation the cam 20 rocks the latch on its bearing 19 and into the opening 31 formed in the wing 32 of the coupling head to receive it. When the cars uncouple the reverse operation automatically takes place.

It will be observed that the lug or anchor device 10 is offset backwards and projects into the hollow sleeve 17, the inside diameter of which is considerably greater than the vertical width of the tie rod 16. This arrangement produces a very flexible universal joint in which the pipe 8 may oscillate considerably with the forward end of the spring relative to the tie rod and independent of movement of the latter. As appears best in Figure 2, the sleeve 17 effectively prevents lateral movement of the spring 6, especially the rear end thereof, with respect to the rod 21, which arrangement completely avoids undesired movement of the latch or dog 18 while in the coupled position. I am aware that the sleeve may be dispensed with, and that the rod 21 may be flat, or a combination of flat or round sections, to prevent rotation in the bearings 23 and 24, and that it may be anchored to the nut 25 otherwise than as shown in the drawings.

What I claim is:

1. In an automatic train pipe connecter, the combination of a coupling head, a bracket, a member projecting from the head rearwardly past the bracket, a spring pressing the member forward against the rear side of said bracket, a support for said spring mounted on the bracket for rocking movement thereon, and a lock for automatically locking said head to a companion head when the cars couple up, said lock including a latch pivoted behind the front face of the head, and a plunger extending from the rear end of said spring support forwardly through an opening in said member into opearting relation to said latch.

2. In an automatic train pipe connecter, the combination of a coupling head, a bracket, a member connecting the head and the bracket and having a part adapted to bear against the rear side of the bracket, a tie rod pivotally anchored to said bracket, a spring surrounding said rod at the rear of said bracket for projecting said head, a device on said rod for holding the spring in place, a lock pivotally carried by said member for locking said head to a mating head, and actuating means for said lock and extending rearwardly through a bearing on said member into rigid engagement with said device.

3. In an automatic train pipe connecter, the combination of a coupling head, a bracket, a member extending rearwardly from the head around said bracket, a projection on said member, a spring seated against said projection, a lock pivoted on said member, a rod extending through said projection rearwardly along said spring for actuating said lock when said spring is compressed, and means to prevent undesired movement of said spring with respect to said lock.

4. An automatic train pipe connecter of the class described, comprising, in combination, a coupling head, a supporting member therefor, a bracket associated with the supporting member, a buffer carried by the supporting member, a tie rod for connecting the buffer and the bracket, means for locking the coupling head to a mating head, cam means for actuating said locking means, and an operating means for the cam means secured to said tie rod.

5. An automatic train pipe connecter of the class described, comprising, in combination, a coupling head, a supporting member therefor, a bracket associated with the supporting member, a buffer carried by the supporting member, a tie rod for connecting the buffer and the bracket, means for locking the coupling head to a mating head, cam means for actuating said locking means, and an operating means for the cam means secured to said tie rod, including a cam member, and means associated with the supporting member for operating said cam member.

6. In an automatic train pipe connecter, the combination with a coupling head, of a member extending rearwardly from the said head, means for supporting the said member, the said member being slidable through the supporting means, locking means pivoted upon the said member adjacent to the coupling head, a portion of the said locking means extending along the said member and terminating in a cam, and means for operating the cam to actuate the locking means.

7. In an automatic train pipe connecter, the combination with a coupling head, of a member extending rearwardly from the said head, means for supporting the said member, the said member being slidable through the supporting means and being flanged adjacent thereto to prevent accidental displacement therefrom, locking means pivoted upon the said member adjacent the coupling head, the said locking means terminating in a cam, and means for operating the cam to actuate the locking means.

8. In an automatic train pipe connecter, the combination with a coupling head, of a member extending rearwardly from the coupling head, means for supporting the said member in movable relationship, locking means pivoted on the said member adjacent the coupling head, a portion of the said locking means terminating in a cam, and means for operating the cam, the said means comprising a plunger, means upon the plunger for operatively engaging the cam, and resilient means carrying the plunger to operate the cam for the actuation of the locking means.

9. In an automatic train pipe connecter, the combination with a coupling head, of a supporting member secured to the coupling head and extending rearwardly thereof, a bracket for carrying the supporting member in movable relationship, a buffer spring extending rearwardly from the supporting member, a locking means pivoted upon the supporting means adjacent the coupling head, and extending from the rear of the coupling head past the outside of the said bracket about which it is adapted to swing, a portion of the locking means forming a cam, and means for actuating said locking means, said last mentioned means terminating at the rear end of the buffer spring.

10. In an automatic train pipe connecter, the combination with a coupling head, of a hollow member extending rearwardly from the coupling head, means for carrying the said member in slidable relationship, locking means pivoted on the said member adjacent the coupling head, a portion of the said locking means terminating in a cam, means for operating the cam comprising a plunger, means upon the plunger for operatively engaging the cam, a spring for carrying the plunger to operate the cam, means for maintaining the spring and plunger in position, and a tie rod extending through the spring and into the said hollow member, the said tie rod being held in place by anchoring means within the said hollow member and by a flange abutting the rear end of the said spring.

In testimony whereof I hereunto affix my signature.

JOSEPH ROBINSON.